United States Patent
Vilkman et al.

(10) Patent No.: US 7,901,595 B2
(45) Date of Patent: Mar. 8, 2011

(54) METHOD OF MANUFACTURING AN ELECTRICALLY CONDUCTIVE ELASTOMER MIXTURE

(75) Inventors: Taisto Vilkman, Tuusula (FI); Mikko Karttunen, Tampere (FI); Lisa Wikström, Lempäälä (FI)

(73) Assignee: Premix Oy, Rajamaki (FI)

( * ) Notice: Subject to any disclaimer, the term of this patent is extended or adjusted under 35 U.S.C. 154(b) by 0 days.

(21) Appl. No.: 11/723,608

(22) Filed: Mar. 21, 2007

(65) Prior Publication Data

US 2007/0246246 A1    Oct. 25, 2007

Related U.S. Application Data

(60) Provisional application No. 60/785,382, filed on Mar. 24, 2006.

(30) Foreign Application Priority Data

Mar. 22, 2006  (EP) ................................. 06111520

(51) Int. Cl.
*H01B 1/06* (2006.01)
*H01B 1/24* (2006.01)

(52) U.S. Cl. ........................ 252/511; 252/513; 252/514; 252/518.1; 524/401; 524/404; 524/496; 524/504; 524/534; 524/555; 525/28; 525/74; 525/88; 525/324

(58) Field of Classification Search .............. 252/500, 252/503, 512, 511, 513, 514, 518.1; 428/480, 428/413, 304.4, 327, 368; 524/404, 28, 88, 524/401, 496, 271, 361, 445, 847, 505, 504, 524/534, 555; 525/74, 494, 505, 191, 454, 525/28, 88, 324; 156/330.9; 473/373; 264/102
See application file for complete search history.

(56) References Cited

U.S. PATENT DOCUMENTS

| | | | | |
|---|---|---|---|---|
| 4,088,626 A | * | 5/1978 | Gergen et al. | 524/505 |
| 4,302,553 A | * | 11/1981 | Frisch et al. | 525/28 |
| 4,557,857 A | * | 12/1985 | Sorensen | 252/503 |
| 4,678,602 A | | 7/1987 | Tanaka et al. | |
| 4,767,817 A | * | 8/1988 | Lee | 524/494 |
| 4,957,968 A | * | 9/1990 | Adur et al. | 525/74 |
| 5,264,476 A | * | 11/1993 | Daimon et al. | 524/271 |

(Continued)

FOREIGN PATENT DOCUMENTS

JP    60-243171    * 12/1985

(Continued)

OTHER PUBLICATIONS

IUPAC compendium of Chemical Terminology, 2nd Edition (1997). http://old.iupac.org/goldbook/I03117.pdf.*

(Continued)

*Primary Examiner* — Mark Kopec
*Assistant Examiner* — Khanh Tuan Nguyen
(74) *Attorney, Agent, or Firm* — Young & Thompson

(57) ABSTRACT

The invention relates to an electrically conductive elastomer mixture and to a method. The mixture comprises a thermoplastic styrene elastomer and, as an electrically conductive filler, metal-containing particles. The mixture further comprises a polymer which is an acid-grafted, acid-anhydride-grafted or acid-copolymer and which forms an IPN (Interpenetrating Polymer Network) network structure with the styrene elastomer.

8 Claims, 1 Drawing Sheet

U.S. PATENT DOCUMENTS

| | | | |
|---|---|---|---|
| 5,437,826 A * | 8/1995 | Martinello et al. | 264/102 |
| 5,709,948 A * | 1/1998 | Perez et al. | 428/413 |
| 5,710,212 A | 1/1998 | Asano et al. | |
| 5,972,499 A * | 10/1999 | Rodriguez et al. | 428/368 |
| 6,228,919 B1 * | 5/2001 | Sommerfeld | 524/361 |
| 6,300,418 B1 * | 10/2001 | Brzoskowski et al. | 525/191 |
| 6,331,586 B1 * | 12/2001 | Thielen et al. | 524/401 |
| 6,358,438 B1 * | 3/2002 | Isozaki et al. | 252/511 |
| 6,359,067 B1 * | 3/2002 | Miyawaki et al. | 525/88 |
| 6,475,628 B2 | 11/2002 | Hase et al. | |
| 6,576,332 B1 * | 6/2003 | Yoshizaki et al. | 428/304.4 |
| 6,589,647 B1 * | 7/2003 | Ozawa et al. | 428/327 |
| 6,875,375 B2 | 4/2005 | Albers et al. | |
| 6,936,191 B2 * | 8/2005 | Fox et al. | 252/512 |
| 7,008,991 B2 * | 3/2006 | Takagi et al. | 524/496 |
| 7,288,604 B2 * | 10/2007 | Kuntimaddi et al. | 525/454 |
| 7,544,311 B2 * | 6/2009 | Chen et al. | 252/500 |
| 2002/0043654 A1 | 4/2002 | Karttunen et al. | |
| 2003/0089892 A1 * | 5/2003 | Fox et al. | 252/500 |
| 2003/0144081 A1 * | 7/2003 | Sullivan et al. | 473/351 |
| 2004/0019143 A1 * | 1/2004 | Koloski et al. | 524/434 |
| 2004/0116571 A1 * | 6/2004 | Su et al. | 524/404 |
| 2004/0178392 A1 | 9/2004 | Albers et al. | |
| 2004/0266558 A1 * | 12/2004 | Kuntimaddi et al. | 473/373 |
| 2005/0176835 A1 * | 8/2005 | Kobayashi et al. | 521/56 |
| 2005/0186438 A1 * | 8/2005 | Alms et al. | 428/480 |
| 2005/0288427 A1 * | 12/2005 | Jeon et al. | 524/555 |
| 2006/0027790 A1 * | 2/2006 | Arai et al. | 252/500 |
| 2006/0223927 A1 | 10/2006 | Hodjat et al. | |
| 2006/0266476 A1 * | 11/2006 | Sehanobish et al. | 156/330.9 |
| 2006/0270790 A1 * | 11/2006 | Comeau | 524/847 |
| 2007/0191526 A1 * | 8/2007 | Jordan et al. | 524/445 |

FOREIGN PATENT DOCUMENTS

| | | |
|---|---|---|
| JP | 62138540 | 6/1987 |
| JP | 04311744 | 11/1992 |
| WO | WO 98/50465 | 11/1998 |
| WO | WO 03/028039 | 4/2003 |

OTHER PUBLICATIONS

Genetti, W.B. et al., J. Mater. Sci. 33 1998, pp. 3085-3093.

Ruschau, G.R. et al., J Appl. Phys. 72, 1992, pp. 953-959.

* cited by examiner

METHOD OF MANUFACTURING AN ELECTRICALLY CONDUCTIVE ELASTOMER MIXTURE

BACKGROUND OF THE INVENTION

The invention relates to an electrically conductive elastomer mixture comprising a thermoplastic styrene elastomer and, as an electrically conductive filler, metal-containing particles.

The invention further relates to a method of manufacturing an electrically conductive elastomer mixture, the elastomer mixture comprising a thermoplastic styrene elastomer and, as an electrically conductive filler, metal-containing particles.

The invention still further relates to a use of an elastomer mixture according to any one of claims 1 to 8 in an electrically conductive seal.

As to their electric properties, polymers and polymer mixtures are usually dielectrics. In some applications, however, it is advantageous for the polymer material to be to some extent electrically conductive. Such applications include e.g. antistatic packages, containers and pipework for inflammable substances, electrostatically paintable formed pieces, and many other applications known per se. Furthermore, the constantly increasing number of electronic devices has resulted in the fact that, on one hand, their electronics have to be protected from electromagnetic interference caused by other electronic devices and, on the other hand, electronic interference caused by such devices on the outside has to be reduced. In other words, the devices have to be EMI-shielded. Electric conductivity is often achieved by compounding a substantially electrically non-conductive polymer operating as a matrix material with metal or metal-covered particles, carbon or graphite or combinations thereof operating as a conductive filler.

The term elastomer refers to a material consisting of macro-molecules and characterized by extensibility and rapid recovery to the original shape after release of tension. Electrically conductive elastomer mixtures are known wherein the matrix material is a thermosetting material, e.g. a silicon polymer. Such a matrix material has to be cross-linked in order to achieve elastic properties and, in general, to make a product workable. Cross-linking is very energy- and time-consuming, and it also requires special cross-linking equipment, making products slow and expensive to manufacture. Prior art also includes electrically conductive thermoplastic elastomer mixtures. Compared to the thermosetting materials, these materials are quick and inexpensive to process, but their specific resistance values are often higher than those of the thermosetting materials.

In order for an elastomer mixture to be electrically conductive, the electrically conductive particles compounded therewith have to be in contact with one another, or a distance between the particles has to be small enough to enable an effective tunneling current to flow therebetween. Furthermore, the particles should form chains leading through the matrix material (G. R. Ruschau et al., J. Appl. Phys. 72, 1992, pp. 953 to 959). The volume fraction of the electrically conductive particles has to be large enough for the aforesaid condition to be met. However, increasing the volume fraction of the filler impairs (inter alia) the mechanical properties, processability or surface quality of the elastomer mixture. In addition, the material often becomes much more expensive. Therefore, the volume fraction cannot be increased infinitely in order to improve electric conductivity.

It is known to improve the electric conductivity of electrically conductive fillers by treating the surface of particles in different manners. An alternative is to employ direct coating of the particles with an electrically conductive polymer. Nickel particles, for example, have been coated with polypyrrole by using a method wherein sodium dodecyl sulphate (SDS) was first applied onto the surface of the nickel particles (Genetti W. B. et al., J. Mater. Sci. 33, 1998, pp. 3085 to 3093). SDS is a surface active agent which forms a double layer around the nickel particles. Next, the pyrrol was subjected to polymerization inside the double layer. This considerably improved the specific conductivity of a particle-filled polyethylene.

U.S. Pat. No. 6,875,375 discloses an electrically conductive thermoplastic elastomer mixture comprising an elastomer matrix and, as an electrically conductive filler, metal-coated particles. The electrically conductive particles are at least partly coated with a self-assembled molecule layer. Optionally, coating may contain molecule conductors which settle between the self-assembled molecules. The specific resistance of the elastomer mixture is low, and does not substantially increase due to the influence of compression.

Addition of stearic acid has also been found to have effects similar to those of the coating materials disclosed in U.S. Pat. No. 6,875,375.

However, the known electrically conductive thermoplastic elastomer mixtures involve a significant problem. Namely, such mixtures are often used for the manufacture of seals. Typically, seals are elongated objects which often form at least one closed loop such that their cross-section is small compared to their length. When such a product is manufactured by injection molding, the molten elastomer mixture is forced to flow a long distance in a narrow channel which constitutes a mold cavity. In other words, inside a mold, the flow distance between a gate, through which the elastomer mixture is fed into the mold cavity, and a weld line, i.e. the point in the mold cavity at which the material flows that fill up the mold cavity meet one another, is long. Consequently, the elastomer mixture is subjected to large shear forces during the entire process of the mold being filled up. As is widely known, an elastomer mixture flows in a channel such that the flow rate of the flowing elastomer mixture is at its lowest in the vicinity of the surface of the channel, increasing therefrom upon approaching the centre line of the cross-section of the channel. In such a flow situation, an elastomer mixture containing a solid filler often becomes subjected to non-homogenization such that some particles that actually belong to the part of the elastomer mixture which flows in the vicinity of the surface of the channel or which has already attached to the surface become separated from this part and propagate together with the mixture flowing in the inner parts of the channel. Due to this phenomenon, the consistency of the electrically conductive filler of the elastomer mixture in the vicinity of a gate may be substantially lower than that of the electrically conductive filler of the elastomer mixture fed into the mold. This substantially increases the value of electric resistance in the vicinity of the gate, which is why the seal fails to fulfill the requirements set for its electric conductivity.

BRIEF DESCRIPTION OF THE INVENTION

An object of the present invention is to provide a novel and improved electrically conductive elastomer mixture and a method of manufacturing an electrically conductive elastomer mixture.

The electrically conductive elastomer mixture according to the invention is characterized in that the mixture further comprises a polymer which contains an acid-grafted, acid-anhydride-grafted or acid-copolymerized functional group and which forms an IPN (Interpenetrating Polymer Network) network structure with the styrene elastomer.

The method according to the invention is characterized by mixing into one another the thermoplastic styrene elastomer and a polymer which contains an acid-grafted, acid-anhydride-grafted or acid-copolymerized functional group and which forms an IPN (Interpenetrating Polymer Network) network structure with the styrene elastomer, and mixing a metal-containing, electrically conductive filler into the IPN structure.

The idea of the invention is that the polymer, which is an acid-grafted, acid-anhydride-grafted or acid-copolymer, forms a continuous network structure in the mixture, that the electrically conductive filler finds its way to the surface of the network structure, and that the electrically conductive filler is bound to the network structure.

An advantage of the invention is that the polymers and the electrically conductive particles of the mixture do not become separated from one another while the mixture flows in a mold.

The idea of an embodiment of the invention is that the mixture preferably further comprises polyphenylene oxide (PPO). The advantage is that PPO improves both the thermal resistance and residual compression values of the mixture.

The idea of another embodiment of the invention is that the mixture comprises a non-grafted polyolefin, polyamide, polybutylene terephthalate, polycarbonate or ethylene/vinyl acetate. The advantage is that the strength and processability of the mixture are further improved.

BRIEF DESCRIPTION OF THE DRAWINGS

Some embodiments of the invention will be described in the accompanying drawings, in which.

Figure 1:
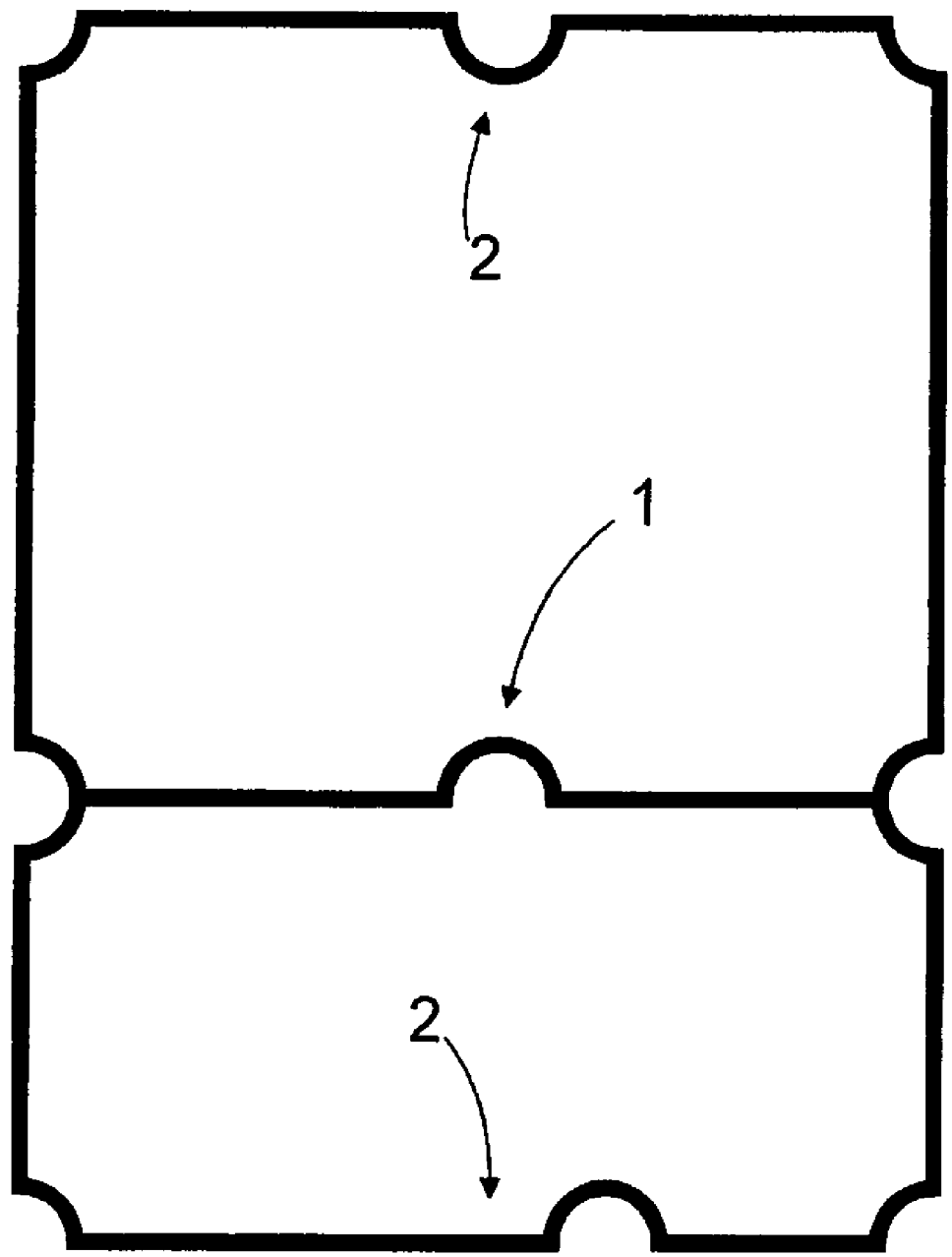
FIG. 1 is a schematic top view showing a seal manufactured from an electrically conductive elastomer mixture according to the invention.

DETAILED DESCRIPTION OF SOME
EMBODIMENTS OF THE INVENTION

Mixtures according to Table 1 were prepared:

TABLE 1

Composition of the mixtures given as parts by weight.

| Mixture | 1 | 2 | 3 | 4 | 5 | 6 |
|---|---|---|---|---|---|---|
| Elastomer | 100 | 100 | 100 | 100 | 100 | 100 |
| Oil | 210 | 300 | 300 | 300 | 270 | 300 |
| Antioxidant | 4 | 4 | 4 | 4 | 4 | 4 |
| PPO | 45 | 45 | 45 | 45 | 20 | 45 |
| PP | 25 | 0 | 0 | 12.5 | 5 | 0 |
| PA | 0 | 0 | 0 | 0 | 0 | 25 |
| MAH-polymer | 0 | 25 | 38 | 12.5 | 25 | 25 |

The elastomer was SEBS (styrene-ethyl-butylene-styrene) elastomer, which is sold under the name of Kraton 6933ES and manufactured by Kraton Polymers. The oil was Primol 352 white oil, manufactured by Exxon Mobil. The antioxidant comprised both Irganox 1010 and 168 materials, manufactured by Ciba Ceigy, two parts of both. The PPO was a material sold under the name of Noryl 6370C, which is a mixture of polyphenylene oxide and polystyrene and manufactured by General Electric. The PP was a polypropylene sold under the name of HE 125M and manufactured by Borealis Polymers. The PA was a polyamide 6, which is sold under the name of Kopa 136 and manufactured by Kolon Engineering Plastics. The MAH-polymer was a maleic-anhydride-grafted polypropylene, sold under the name of Polybond 3200 and manufactured by Chemtura Corporation.

The mixtures were compounded by first mixing the elastomer, oil and antioxidant agents into one another in a rapid mixer such that the oil was absorbed and a highly flowable pulver was achieved. Next, the other components were mixed with the pulver and the mixture was compounded in a Berstorf ZE 40 double-screw extruder. The screw of the extruder and the mixing conditions enabled a range of shear rate of $500 \ldots 5000\ s^{-1}$ to be achieved. The polymer and the MAH-polymer thus formed a separate, continuous IPN structure in the elastomer. During compounding, formation of the phase structure was studied by observing the melt strength and both the extension and the tensile strength of test samples. The continuous IPN structure improved the tensile strength of the test samples.

During compounding, temperature settings for the extruder were the following, starting from a feed point and given in centigrades: 20-120-200-220-240-200-200-200. The screw revolved 300 rpm, and the feed amount was 20 kg/h.

Instead of SEBS, the elastomer may be e.g. styrene-ethylene-propylene-styrene (SEPS), styrene-butylene-styrene (SBS), styrene-isoprene-styrene (SIS), styrene-ethyl-butylene (SEB), or another corresponding thermoplastic styrene elastomer, a mixture of two or more thermoplastic styrene elastomer of the aforesaid kind, or a mixture having, in addition to one or more styrene elastomer component, a polymer which is unmixable with these.

The polypropylene, of which mixture 1 contained ungrafted while mixtures 2 to 6 contained polypropylene either exclusively as a grafted MAH-polymer or, additionally, ungrafted, together with the elastomer formed a fine IPN network structure. Such a phenomenon occurs when compounding is carried out using a high—$500 \ldots 5000\ s^{-1}$—shear rate. It is to be noted that the polypropylene may be a homo- or copolymer, a block polymer or a heterophase polymer. It may also be another polyolefin, such as a polyethylene or ethylene-propylene-diene copolymer. A polyamide may also form an IPN network structure, which is shown by mixture 6. An IPN network structure may also be formed by at least a polybutylene terephthalate (PBT), polycarbonate (PC), polyethersulfone (PES), and ethylene vinyl acetate (EVA).

The rubber part of the styrene elastomer was softened with a mineral oil. By using an aliphatic oil, the oil can be prevented from being absorbed in the styrene part, enabling a soft mixture having good residual compression values to be achieved.

It is to be noted in this connection that no oil, antioxidant or PPO is necessary, but they can be omitted if the properties of a product to be manufactured require no use of such agents. No PPO, for example, needs to be added if no specific requirements for the residual compression of a product to be manufactured are set.

The IPN network structure of the above-manufactured mixtures 2 to 6 thus comprises a polyolefin which is maleic-acid-grafted. Instead of this or together with it, an acid copolymer may also be used. A functional group formed in grafting or copolymerization may be e.g. an acrylic, methacrylic, maleic or fumaric acid or an acid anhydride thereof. Also, two or more mutually different functional groups may be grafted or copolymerized to the polymer. Such polymers include e.g. compounds containing a glycidyl, such as terpolymers of ethylene-butylacrylate-glycidylmethacrylate. It is further to be separately noted that in the present application, the concepts "copolymer" and "copolymerization" also refer to terpolymers and the manufacture thereof. A polymer formed by an IPN network structure may be a mixture which, in addition to an acid-grafted or acid-copolymerized polyolefin, also comprises another polymer, such as a polyolefin, polyamide or another semicrystalline polymer.

Compound samples were extracted with room-temperature toluene for 12 hours. Next, the samples were washed with clean toluene. In the insoluble polymer, which was a polypropylene, maleic-acid-grafted polypropylene or a mixture thereof, a fine network structure, i.e. an IPN network structure, was established by microscopy. It was established that all samples contained such a structure.

Next, an electrically conductive filler was added to mixtures 1 to 9 in amounts according to Table 2, resulting in nine sample mixtures. In order to improve mixing, elastomer granules were treated with stearic acid prior to compounding as follows: 30 ml of Primol 352 oil was heated to a temperature of 70° C. This was mixed with 4 g of stearic acid so that the acid dissolved. The warm mixture was mixed with the granules. Instead of stearic acid, some other macromolecular carboxylic acid may be used. It is to be noted, however, that no acid treatment is necessary.

TABLE 2

Composition of the sample mixtures given as parts by weight.

| Sample mixture | 1a | 2a | 3a | 4a | 5a | 6a | 7a | 8a | 9a |
|---|---|---|---|---|---|---|---|---|---|
| Mixture 1 | 25 | | | | | | | 25 | |
| Mixture 2 | | 25 | | | | | | 25 | 25 |
| Mixture 3 | | | 25 | | | | | | |
| Mixture 4 | | | | 25 | | | | | |
| Mixture 5 | | | | | 25 | | | | |
| Mixture 6 | | | | | | | | | 25 |
| Ni-flake | 75 | 75 | 75 | 75 | 75 | | | 10 | 75 |
| Ag-ball | | | | | | 56.25 | 56.25 | 50 | |
| Ag-fiber | | | | | | 18.75 | 18.75 | 15 | |

The Ni-flake was a nickel-coated graphite, sold under the name of Novamet 75% and manufactured by Novamet Specialty Products Corporation. The Ag-ball refers to silver-coated glass balls, sold under the name of N3000S3N, and the Ag-fiber to silver-coated glass fibers, sold under the name of SF82TF8 and manufactured by Potters Industries Inc.

The sample mixtures contained 75 parts by weight of an electrically conductive filler and 25 parts by weight of mixture. Naturally, the ratio may also be a different one, mainly depending on the desired value of electric conductivity and the specific weight of the filler. Of course, the electrically conductive filler may be another organic or inorganic metal-coated particle or all-metal particle. The sample mixtures were compounded in the same extruder which was used for preparing the elastomer mixtures. This time, the screw structure was a mixing one only and the shear rate was low. The compounding conditions were as follows: temperature settings for the extruder, starting from a feed point and given in centigrades: 20-150-200-200-200-200-200-200. The screw revolved 150 rpm, and the feed amount was 20 kg/h.

Due to the network structure of the MAH-polymer, it does not coat the filler material particles.

It is to be noted in this connection that it is also possible to feed the thermoplastic elastomer and the maleic-acid-grafted polymer into the extruder at its starting end, and to feed the electrically conductive filler into the thermoplastic elastomer and the maleic-acid-grafted polymer through a more distant feed opening. This ensures a complete, electrically conductive elastomer mixture during one and the same extrusion performance. The mixing procedures may naturally also be carried out in a batch mixer.

Test pieces were injection-molded from elastomer mixtures 1a to 9a in order to measure mechanical properties and residual compression. The residual compression was measured on samples which had been kept at a temperature of 85° C. for 24 hours. The measurement results are shown in Table 3.

TABLE 3

Mechanical properties and residual compression.

| | 1a | 2a | 3a | 4a | 5a | 6a | 7a | 8a | 9a |
|---|---|---|---|---|---|---|---|---|---|
| Tensile strength [MPa] | 0.6 | 1.7 | 1.8 | 1.3 | 1.4 | 0.3 | 0.9 | 0.8 | 1.7 |
| Yield strength [MPa] | 0.6 | 1.8 | 1.8 | 1.4 | 1.4 | 0.4 | 1.0 | 0.9 | 1.8 |
| Elongation at break [%] | 340 | 200 | 210 | 240 | 220 | 120 | 57 | 97 | 190 |
| Yield strain [%] | 15 | 170 | 175 | 190 | 168 | 13 | 28 | 51 | 170 |
| Residual compression [%] | 40 | 20 | 32 | 18 | 30 | 40 | 26 | 28 | 25 |
| Hardness [Shore A] | 60 | 57 | 58 | 72 | 60 | 65 | 60 | 60 | 67 |

As can be seen in Table 3, the tensile strength, yield strength, yield strain and residual compression of the MAH-polymer-containing elastomer mixtures 2a to 5a and 7a to 9a are substantially better than those of the non-MAH-polymer-containing elastomer mixtures 1a and 6a.

An electrically conductive elastomer mixture was also prepared which contained: 100 parts of SEBS, 300 parts of oil, 4 parts of antioxidant, 45 parts of PPO, 35 parts of PA, and 35 parts of acid-grafted SEBS, sold under the name of Kraton FG1901X. An electrically conductive filler consisted of Ni-flake and its amount was 75 parts while the mixture accounted for 25 parts. The residual compression of this elastomer mixture was 70%, i.e. rather poor.

FIG. 1 is a schematic top view showing a seal manufactured from an electrically conductive elastomer mixture according to the invention. A seal for use in electromagnetic radiation shielding according to FIG. 1 was injection-molded from elastomer mixtures 1a to 9a. The cross-section of the seal was circular. The location of a gate of a mold cavity, i.e. the point at which the elastomer mixture was injected into the mold cavity, is designated by reference number 1. Weld lines, i.e. the points of the seal at which the elastomer flows propagating in the mold cavity met one another, are designated by reference number 2. It is to be noted that the elastomer mixtures according to the invention naturally enable the manufacture of seals or other products of another shape as well. It is further to be noted that a product is not necessarily manufactured by injection molding. Since the melt strength of the elastomer mixtures according to the invention is clearly higher than that of the previously known elastomer mixtures, sheets and profiles or the like are substantially easier to manufacture by using an extrusion method.

In the mold cavity forming the electrically conductive seal according to FIG. 1, the flow distance between the gate 1 and the weld line 2 is long. It is obvious that a seal should have a good electric conductivity in all its parts. Sufficient conductivity requires a sufficient concentration of an electrically conductive filler in all parts of the seal.

The filler concentrations in the seal according to FIG. 1 were determined by means of a Perkin Elmer TGA analyzer. Resistance values were measured by means of an Agilent 34401A multimeter such that an object to be measured was placed on an aluminum sheet and an electrode according to the MIL-G-83528A standard was placed on top of the object. The meter was connected between the sheet and one end of the electrode. The reading indicated the resistance the seal caused perpendicularly between the aluminum sheet and the electrode. The filler concentrations and resistance values are shown in Table 4.

increase considerably in the vicinity of the gate 1. Such seals are not useful. Similarly, in the vicinity of the weld line 2 the filler concentration was 2 . . . 3% higher than in the injected elastomer mixture, and the electric resistance values are good at the weld line 2. This does not, however, render the seal useful, since the usefulness of a seal is determined by the least electrically conductive part thereof.

In practice, the filler concentration of an elastomer mixture cannot be increased since this would result in an increase in the melt viscosity and hardness of the mixture. An increase in the melt viscosity limits the forming possibilities of a product, whereas hardness limits the use of a material as a seal.

Advantages of the elastomer mixtures of the invention become emphasized if, during the manufacture of a product, the mixture is subjected to large shear forces and if the flow distance of the mixture is long.

In addition to elastomer mixtures 1a to 9a, a mixture corresponding to elastomer mixture 6a was prepared but no carboxylic acid was used to treat the filler particles with during preparation. The electric resistance of this elastomer mixture was still 10 to 100 times as high as that of elastomer mixture 6a.

In some cases the features disclosed in the present application can be used as such, regardless of other features. On the other hand, when necessary, features disclosed in the present application may be combined in order to form different combinations.

The drawings and the related description are only intended to illustrate the idea of the invention. The details of the invention may vary within the scope of the claims.

The invention claimed is:

1. A method of manufacturing an electrically conductive elastomer mixture, the elastomer mixture comprising a thermoplastic styrene elastomer and metal-containing particles comprising nickel or silver coated particles as an electrically conductive filler, the method comprising:

mixing into one another the thermoplastic styrene elastomer and a polymer to form an IPN (Interpenetrating Polymer Network) network structure with the thermoplastic styrene elastomer, wherein the polymer, which contains an acid-grafted, acid-anhydride-grafted or acid-copolymerized functional group, comprises polyolefin, and the amount of polymer is 10 to 50 parts per 100 parts of styrene elastomer, given as parts of weight, and mixing the metal-containing, electrically conductive filler into the IPN structure.

2. The method as claimed in claim 1, further comprising:

TABLE 4

Filler concentrations and resistance values.

|  | 1a | 2a | 3a | 4a | 5a | 6a | 7a | 8a | 9a |
| --- | --- | --- | --- | --- | --- | --- | --- | --- | --- |
| Gate [%] | 72.3 | 74.8 | 74.7 | 73.5 | 74.4 | 71.2 | 74.0 | 74.5 | 74.6 |
| Weld line [%] | 77.5 | 75.2 | 75.4 | 76.6 | 75.6 | 77.8 | 76.2 | 75.8 | 75.5 |
| Resistance/Gate [Ohm] | 102 | 0.8 | 1.2 | 18.1 | 1.4 | 275 | 1.4 | 0.7 | 1.4 |
| Resistance/Weld line [Ohm] | 0.2 | 0.6 | 1.8 | 0.3 | 0.3 | 0.4 | 0.3 | 0.5 | 2.0 |

It can be seen in Table 4 that when the seal was manufactured from elastomer mixtures 1a to 6a, the filler concentration in the vicinity of the gate 1 was approximately 3 . . . 4 percentages lower than the filler concentration of 75% in the elastomer mixture injected into the mold cavity. A decrease in the filler concentration causes the electric resistance to mixing the thermoplastic styrene elastomer and the polymer into one another in a first mixer, removing the mixture formed by the thermoplastic styrene elastomer and the polymer and having the IPN structure from the first mixer, and mixing the electronically conductive filler into the IPN structure in another mixing procedure.

3. The method as claimed in claim 2, wherein the mixer is an extruder.

4. The method as claimed in claim 2, wherein the mixer is a batch mixer.

5. The method as claimed in claim 1, comprising
mixing the thermoplastic styrene elastomer and the polymer into one another at a starting end of an extruder, and
mixing the electrically conductive filler into the IPN-structure at a final end of the same extruder.

6. The method as claimed in claim 1, wherein said IPN network structure comprises the thermoplastic styrene elastomer as a first polymer component and the polymer as a second polymer component, wherein the thermoplastic styrene elastomer forms a first network and the polymer forms a second network.

7. The method as claimed in claim 1, wherein the amount of polymer is 12.5 to 38 parts per 100 parts of styrene elastomer.

8. A method of manufacturing an electrically conductive elastomer mixture, the elastomer mixture comprising a thermoplastic styrene elastomer and metal-containing particles comprising nickel or silver coated particles as an electrically conductive filler, the method comprising:

mixing into one another the thermoplastic styrene elastomer and a polymer to form an IPN (Interpenetrating Polymer Network) network structure with the thermoplastic styrene elastomer, wherein the polymer, which contains an acid-grafted, acid-anhydride-grafted or acid-copolymerized functional group, comprises polyolefin, the amount of polymer is 10 to 50 parts per 100 parts of styrene elastomer, given as parts of weight, and mixing the electrically conductive filler into the IPN structure, wherein the filler is treated with a carboxylic acid prior to mixing it into the mixture.

* * * * *